US012489789B2

(12) United States Patent
Koikara et al.

(10) Patent No.: US 12,489,789 B2
(45) Date of Patent: Dec. 2, 2025

(54) ELIMINATING DOUBLE ENCRYPTION IN ZERO-TRUST NETWORK ACCESS AUTHENTICATED SESSIONS

(71) Applicant: Cisco Technology, Inc., San Jose, CA (US)

(72) Inventors: George Mathew Koikara, Bangalore (IN); Pruthvi Panyam Nataraj, Bangalore (IN); Naveen Gujje, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 18/220,057

(22) Filed: Jul. 10, 2023

(65) Prior Publication Data

US 2025/0023915 A1    Jan. 16, 2025

(51) Int. Cl.
H04L 9/40    (2022.01)

(52) U.S. Cl.
CPC ........ *H04L 63/166* (2013.01); *H04L 63/0435* (2013.01); *H04L 63/1425* (2013.01)

(58) Field of Classification Search
CPC ............. H04L 63/0272; H04L 63/0281; H04L 63/0428; H04L 63/0435; H04L 63/1425; H04L 63/166; H04L 63/168
See application file for complete search history.

(56) References Cited

U.S. PATENT DOCUMENTS

| 2010/0235620 A1 | 9/2010 | Nylander |
| 2014/0019751 A1 | 1/2014 | Hsu et al. |
| 2016/0285823 A1* | 9/2016 | Herrero ............... H04L 63/0428 |
| 2016/0315920 A1 | 10/2016 | Kurmala et al. |
| 2018/0332003 A1* | 11/2018 | Deriso ................ H04L 63/0823 |

(Continued)

FOREIGN PATENT DOCUMENTS

| EP | 4369656 A1 | 5/2024 |
| WO | WO20230108394 A1 | 2/2023 |

OTHER PUBLICATIONS

E. Rescorla, "RFC 8446 The Transport Layer Security (TLS) Protocol Version 1.3", Internet Engineering Task Force (IETF Aug. 2018) (Year: 2018).*

(Continued)

*Primary Examiner* — Theodore C Parsons
(74) *Attorney, Agent, or Firm* — Lee & Hayes, P.C.

(57) ABSTRACT

Techniques and architecture are described for eliminating double encryption in zero-trust network access authenticated sessions. The techniques include an endpoint client-based proxy of a network receiving, from a browser, a request to access a protected private service. The endpoint client-based proxy pauses access of the browser to the protected private service and establishes a transport layer security (TLS) connection between the endpoint client-based proxy and a zero-trust network access (ZTNA) gateway. The ZTNA gateway determines whether the protected private service uses a secure transport mechanism and establishes either a null cipher encrypted tunnel between at least the endpoint client-based proxy and the ZTNA gateway or a non-null cipher encrypted tunnel between at least the endpoint client-based proxy and the ZTNA gateway. The endpoint client-based proxy resumes access of the browser to the protected private service.

18 Claims, 6 Drawing Sheets

(56) References Cited

U.S. PATENT DOCUMENTS

| | | | |
|---|---|---|---|
| 2019/0109820 A1* | 4/2019 | Clark | H04L 9/0861 |
| 2019/0222571 A1* | 7/2019 | Fausak | G06F 13/385 |
| 2020/0186507 A1* | 6/2020 | Dhanabalan | H04L 63/0272 |
| 2020/0204519 A1* | 6/2020 | Isaev | H04L 63/029 |
| 2021/0273927 A1 | 9/2021 | Dhanabalan et al. | |
| 2021/0314359 A1* | 10/2021 | Thyagaturu | H04L 63/029 |
| 2022/0070154 A1 | 3/2022 | Mestery et al. | |

OTHER PUBLICATIONS

Search Report and Written Opinion for International Application No. PCT/US24/35441, Dated Oct. 4, 2024, 14 pages.

Hicks, Richard, "Direct Access IP-HTTPS Null Cipher Suites Not Available," richardhicks.com, published Jan. 17, 2017, 42 pages.

* cited by examiner

ELIMINATING DOUBLE ENCRYPTION IN ZERO-TRUST NETWORK ACCESS AUTHENTICATED SESSIONS

TECHNICAL FIELD

The present disclosure relates generally to eliminating double encryption in zero-trust network access (ZTNA) authenticated sessions, and more particularly, to eliminating double encryption in zero-trust network access authenticated sessions by overloading subject name and issuer (SNI) in transport layer security (TLS) and using NULL encryption.

BACKGROUND

In a networking environment, there generally are multiple proxies operating at the L4, L5 and L7 layers of the open systems interconnection (OSI) stack. At the L4 layer, the protocols do not support any means of authenticating the connection. Transport layer security (TLS) proxies operate at the L5 layer, while hypertext transport protocol (HTTP) or other application proxies operate at the L7 layer. Most of the session context and authentication is usually done at the L7 layer by using HTTP cookies in the case of HTTP connections (or other application specific authorization mechanisms). In the case of application traffic that is protected by TLS, the TLS layer has to first process the connection involving cryptographic operations and then pass the plain text to the application layers. The TLS operations involved are computationally expensive and in the case of attacks, the server can be overwhelmed with such computation leading to a denial of service to valid clients.

Additionally, on devices such as, for example, firewalls, traffic can be inspected for which the content needs to be decrypted. However, there are certain services that are not expected to be inspected in which case decryption need not be performed. Typically, most approaches involve creating an encrypted tunnel to the firewall that carries traffic that is thus additionally encrypted. After decrypting the outer layer, the firewall or gateway decides whether to inspect the internal traffic or not. In cases where the internal service (e.g., a browser) is already protected with hypertext transport protocol secure (HTTPS) and needs to be inspected, there are now two levels of decryption to be performed. A first or outer decryption is needed for accessing the internal traffic and a second or outer decryption is needed for the internal traffic. Post inspection, the traffic has to be re-encrypted before passing the traffic on. On devices such as firewalls, especially in the hardware offering, this double encryption is costly and generally adds no security benefit. In general, decryption operations are costly and impact the price-to-performance factor on devices that intend to decrypt and inspect the traffic. Client based ZTNA models aggravate this further by introducing another level of encryption and decryption with an outer tunnel. This is a known problem in the industry

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
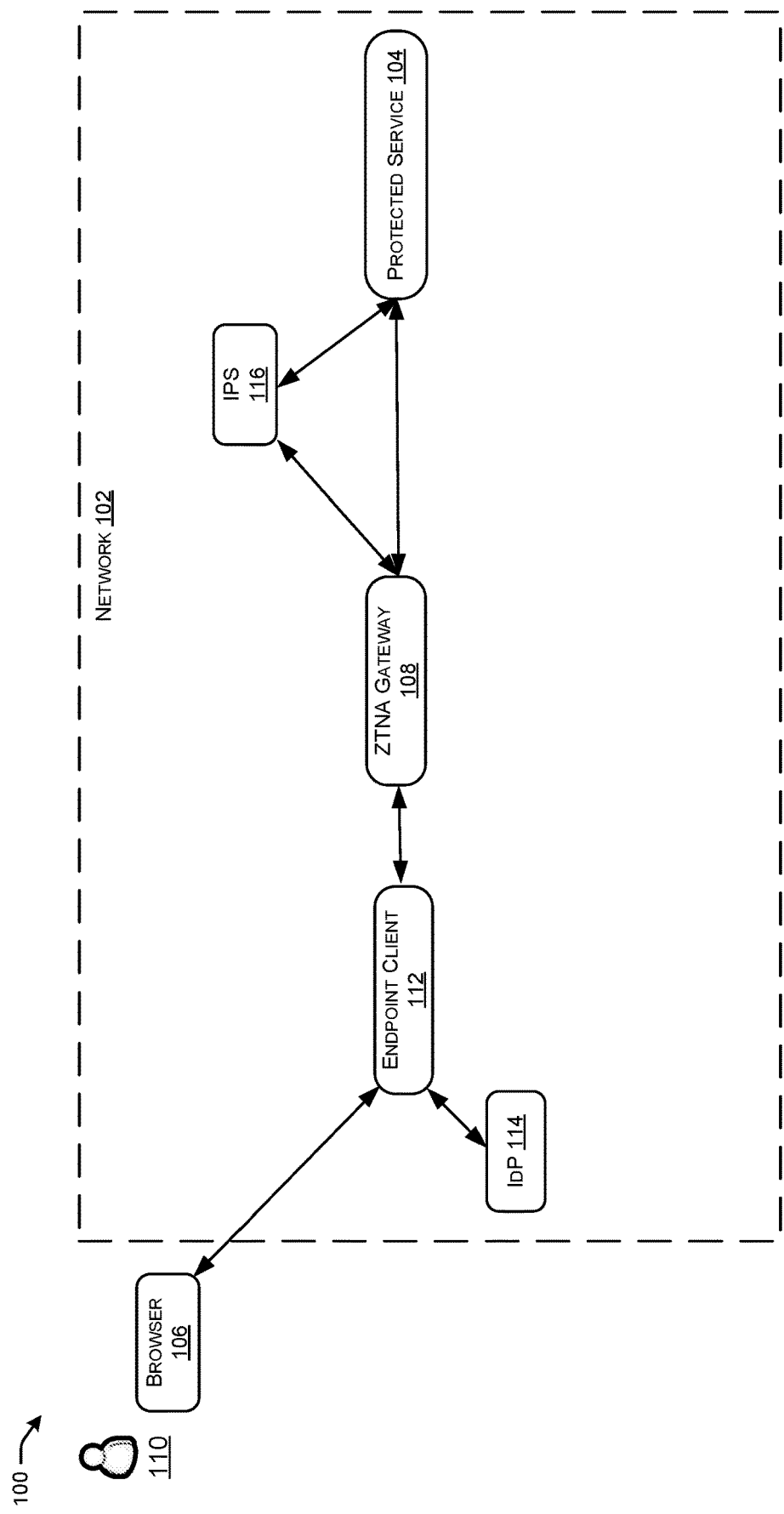
FIG. 1 schematically illustrates an example arrangement of a network and a protected private service or application that is accessed by a browser of the network, in accordance with techniques and architecture described herein.

The present disclosure provides techniques and architecture for eliminating double encryption in zero-trust network access authenticated sessions. In particular, the techniques and architecture provide for eliminating double encryption in zero-trust network access (ZTNA) authenticated sessions by overloading subject name and issuer (SNI) in transport layer security (TLS) and using NULL encryption. For example, when an application that is protected by a gateway is accessed, the gateway may, based on security policy (e.g., whether inspection of traffic is needed or not), decide whether a NULL cipher may be used for an outer tunnel from an unprotected network to a protected private service, e.g., a service or application.

As an example, a method may include receiving, by an endpoint client-based proxy of a network from a browser, a request to access a protected private service. The method may further include pausing, by the endpoint client-based proxy, access of the browser to the protected private service and authenticating, by the endpoint client-based proxy, a user of the browser. The method may also include establishing, by the endpoint client-based proxy, a transport layer security (TLS) connection between the endpoint client-based proxy and a zero-trust network access (ZTNA) gateway and determining, by the ZTNA gateway, whether traffic between the browser and the protected private service needs to be inspected. The method may further include one of (i) based at least in part on determining, by the ZTNA gateway, the protected private service uses a secure transport mechanism, establishing, by the ZTNA gateway, a null cipher encrypted tunnel between at least the endpoint client-based proxy and the ZTNA gateway, or (ii) based at least in part on determining, by the ZTNA gateway, the protected private service uses a non-secure transport mechanism, establishing, by the ZTNA gateway, a non-null cipher encrypted tunnel between at least the endpoint client-based proxy and the ZTNA gateway. The method may also include resuming, by the endpoint client-based proxy, access of the browser to the protected private service.

EXAMPLE EMBODIMENTS

In accordance with configurations described herein, as previously noted, techniques and architecture are provided for eliminating double encryption in zero-trust network access authenticated sessions. In particular, the techniques and architecture provide for eliminating double encryption in zero-trust network access authenticated sessions by overloading subject name and issuer (SNI) in transport layer security (TLS) and using NULL encryption. For example, when an application that is protected by a gateway is accessed, the gateway may, based on security policy (e.g., whether inspection of traffic is needed or not), decide whether a NULL cipher may be used for an outer tunnel from an unprotected network to a protected private service or application.

For the descriptions herein of example configurations, a protected private service (e.g., an external service with respect to an enterprise network) refers to an application that is behind an enterprise gateway. The gateway refers to a firewall or any other proxy capable of authenticating users. An endpoint client refers to a proxy-based client that establishes a per app tunnel to the gateway. A browser (or any other application) may be used to access the protected private service. An identity provider (IdP) authenticates users, e.g., users of the unprotected network. Additionally, for the descriptions herein of example configurations it is assumed that the endpoint client has been onboarded for the zero-trust network access (ZTNA) and client software has been installed on the endpoint client. Additionally, it is assumed that the client has a certificate that can be used to authenticate the endpoint client and the client software has knowledge of which services are protected private services.

In accordance with the techniques and architecture described herein, in configurations, the browser attempts to access the protected private service. The client software on the endpoint client intercepts the access and masquerades as the protected private service. The client software completes a transmission control protocol (TCP) 3-way handshake (3WHS) and pauses or blocks the connection between the browser and the protected private service.

The client software on the endpoint client initiates a connection with the gateway to authenticate a user of the browser for the protected private service. The gateway redirects the client to the IdP for authorization (AuthN). After AuthN is completed, the client returns to the gateway with an AuthN token.

The gateway validates the AuthN token and determines if the protected private service is already protected with a secure transport mechanism, e.g., with HTTPs or other encrypted protocols. The gateway also determines if the service needs to be inspected by an intrusion detection system or prevention system (IDS/IPS) service. The gateway creates a unique subject name and issuer (SNI) token and returns the unique SNI token to the endpoint client.

The endpoint client creates another TLS connection to the gateway but this time uses the unique SNI token in the SNI field. The gateway determines from the SNI field the security policy that needs to be applied on the traffic between the browser and the protected private service. The gateway validates the endpoint client with the client certificate to avoid replay and spoofing of the packet.

If the traffic is destined for an application that is already encrypted and no inspection is needed, the gateway elects to use a NULL cipher for the TLS encryption. Once this tunnel is established, the endpoint client resumes the browser traffic and encapsulates the TLS client hello packet from the browser in the NULL cipher tunnel. Before encapsulating the client hello packet, the original SNI token for the protected private service sent by the browser is replaced by the unique SNI token. The rest of the client hello fields are untouched.

The gateway receives this data on an authenticated channel (by virtue of the unique SNI token and cross verified with the client certificate). The gateway decrypts the NULL encrypted data and replaces the unique SNI token with the actual SNI token associated with the protected private service in the client hello packet and sends it to the protected private service. The protected private service responds with a server hello. The gateway encapsulates this packet on the NULL cipher tunnel and sends it to the endpoint client. The endpoint client decrypts the NULL encrypted packet and sends the packet to the browser.

If the backend application, e.g., the protected private service, does not use a secure transport mechanism such as, for example, HTTPs or secure shell (SSH) between the gateway and the protected private service and a service such as IPS needs to inspect the traffic, then the outer tunnel, e.g., the tunnel between the endpoint client and the gateway, uses a non-NULL cipher and internal network traffic is plain traffic.

If between the gateway and the protected private service, a service such as IPS needs to inspect the traffic, then the inner encryption may be between the browser and the IPS engine and the traffic in the outer tunnel is NULL encrypted in cases where the protected private service is using HTTPs. If the protected private service is using HTTP, then the traffic between the endpoint client and the gateway is encrypted with a non-NULL cipher and the traffic outside the tunnel is plain traffic.

Accordingly, in configurations, a method includes receiving, by an endpoint client-based proxy of a network from a browser, a request to access a protected private service. The method further includes pausing, by the endpoint client-based proxy, access of the browser to the protected private service and authenticating, by the endpoint client-based proxy, a user of the browser. The method also includes establishing, by the endpoint client-based proxy, a transport layer security (TLS) connection between the endpoint client-based proxy and a zero-trust network access (ZTNA) gateway and determining, by the ZTNA gateway, whether traffic between the browser and the protected private service needs to be inspected. The method further includes one of (i) based at least in part on determining, by the ZTNA gateway, the protected private service uses a secure transport mechanism, establishing, by the ZTNA gateway, a null cipher encrypted tunnel between at least the endpoint client-based proxy and the ZTNA gateway, or (ii) based at least in part on determining, by the ZTNA gateway, the protected private service uses a non-secure transport mechanism, establishing, by the ZTNA gateway, a non-null cipher encrypted tunnel between at least the endpoint client-based proxy and the ZTNA gateway. The method also includes resuming, by the endpoint client-based proxy, access of the browser to the protected private service.

In configurations, the ZTNA gateway determines that traffic between the browser and the protected private service needs to be inspected and the method further comprises inspecting, by an intrusion prevention service (IPS) engine, traffic between the browser and the protected private service.

In further configurations, the ZTNA gateway determines the protected private service uses the secure transport mechanism and the method further comprises establishing, by the ZTNA gateway, a null cipher encrypted tunnel between the endpoint client-based proxy and the ZTNA gateway. In further configurations, the ZTNA gateway determines the protected private service uses the non-secure transport mechanism and the method further comprises establishing, by the ZTNA gateway, a non-null cipher encrypted tunnel between the endpoint client-based proxy and the ZTNA gateway.

In additional configurations, the ZTNA gateway determines that traffic between the browser and the protected private service does not need to be inspected and the method further comprises establishing, by the ZTNA gateway, a null cipher encrypted tunnel between the endpoint client-based proxy and the ZTNA gateway.

In configurations, determining whether traffic between the browser and the protected private service needs to be inspected comprises determining, by the ZTNA gateway, whether traffic between the browser and the protected private service needs to be inspected based at least in part on a subject name and issuer (SNI) token associated with the protected private service. In such configurations, the method further comprises generating, by the ZTNA gateway, a unique SNI token, and providing, by the ZTNA gateway to the endpoint client-based proxy, the unique SNI token, wherein resuming access of the browser to the protected private service comprises replacing the SNI token associated with the protected private service in a client hello packet with the unique SNI token. Additionally, in configurations, the method further comprises replacing, by the ZTNA gateway, the unique SNI token in the client hello packet with the SNI token associated with the protected private service and forwarding, by the ZTNA gateway to the protected private service, the client hello packet with the SNI token associated with the protected private service.

Thus, at any point in time, there is only one level of encryption involved. The unique SNI token is generated on a per app per user per session basis. This ensures that observers do not see which services are being accessed behind the gateway or which services are protected by the gateway. Since only one level of encryption is used at any time, the compute requirements are reduced. The latency and throughput are also improved and can scale much higher when compared to double encryption mechanisms. Additionally, the NULL encryption and decryption are almost zero cost and thus save precious compute resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example arrangement 100 of a network 102 and a protected private service or application 104 that is accessed by a browser 106. In configurations, the browser 106 may be within an unprotected network (not shown). The protected private service 104 refers to an application that is behind an enterprise gateway, e.g., a zero-trust network access (ZTNA) gateway 108, and is protected by the enterprise gateway. The ZTNA gateway 108 refers to a firewall or any other proxy capable of authenticating users, e.g., a user 110 of the browser 106. An endpoint client 112 is included in the network 102 and refers to a proxy-based client that establishes a per app tunnel to the ZTNA gateway 108. The browser 106 (or any other application) may be used to access the protected private service 104. An identity provider (IdP) 114 authenticates users, e.g., users of the network 102. Additionally, for the descriptions herein of example configurations it is assumed that the endpoint client has been onboarded for the ZTNA gateway 108 and client software has been installed on the endpoint client 112. Additionally, it is assumed that the client has a certificate that can be used to authenticate the endpoint client 112 and the client software has knowledge of which services are protected private services.

In accordance with the techniques and architecture described herein, in configurations, the browser 106 attempts to access the protected private service 104. The client software on the endpoint client 112 intercepts the access and masquerades as the protected private service 104. The client software completes a transmission control protocol (TCP) 3-way handshake (3WHS) and pauses or blocks the connection between the browser 106 and the protected private service 104.

The client software on the endpoint client 112 initiates a connection with the ZTNA gateway 108 to authenticate the user 110 of the browser 106 for the protected private service 104. The ZTNA gateway 104 redirects the endpoint client 112 to the IdP 102 for authentication (AuthN). After AuthN is completed, the endpoint client 112 returns to the ZTNA gateway with an AuthN token.

The ZTNA gateway 108 validates the AuthN token and determines if the protected private service 104 is already protected with a secure transport mechanism, e.g., with HTTPs or other encrypted protocols. The ZTNA gateway 108 also determines if the protected private service 104 needs to be inspected by an intrusion detection system or prevention system (IDS/IPS) service, e.g., IPS service 116. The ZTNA gateway 108 creates a unique subject name and issuer (SNI) token and returns the unique SNI token to the endpoint client 112.

The endpoint client 112 creates another TLS connection to the ZTNA gateway 108 but this time uses the unique SNI token in the SNI field. The ZTNA gateway 108 determines from the SNI field the security policy that needs to be applied on the traffic between the browser 106 and the protected private service 104. The ZTNA gateway 108 validates the endpoint client 112 with the client certificate to avoid replay and spoofing of the packet.

If the traffic is destined for an application, e.g., protected service 104, that is already encrypted and no inspection is needed, the ZTNA gateway 108 elects to use a NULL cipher for the TLS encryption. Once this tunnel is established, the endpoint client 112 resumes or unblocks the browser traffic and encapsulates the TLS client hello packet from the browser 106 in the NULL cipher tunnel. Before encapsulating the client hello packet, the original SNI token for the protected private service 104 sent by the browser 106 is replaced by the unique SNI token. The rest of the client hello fields are untouched.

The ZTNA gateway 108 receives this data on an authenticated channel (by virtue of the unique SNI token and cross verified with the client certificate). The ZTNA gateway 108 decrypts the NULL encrypted data and replaces the unique SNI token with the actual SNI token associated with the protected private service 104 in the client hello packet and sends it to the protected private service 104. The protected private service 104 responds with a server hello. The ZTNA gateway 108 encapsulates this packet on the NULL cipher tunnel and sends it to the endpoint client 112. The endpoint client 112 decrypts the NULL encrypted packet and sends the packet to the browser 106.

If the backend application, e.g., the protected private service 104, does not use a secure transport mechanism such as, for example, HTTPs or secure shell (SSH) between the ZTNA gateway 108 and the protected private service 104 and a service such as IPS 116 needs to inspect the traffic, then the outer tunnel, e.g., the tunnel between the endpoint client 112 and the ZTNA gateway 108, uses a non-NULL cipher and internal network traffic is plain traffic.

If between the ZTNA gateway 108 and the protected private service 104, a service such as IPS 116 needs to inspect the traffic, then the inner encryption may be between the browser 106 and the IPS engine 116 and the outer tunnel is NULL encrypted in cases where the protected private service 104 is using HTTPs. If the protected private service 104 is using HTTP, then the traffic between the endpoint client 112 and the ZTNA gateway 108 is encrypted with a non-NULL cipher and the outer tunnel traffic is plain traffic.

Figure 2:
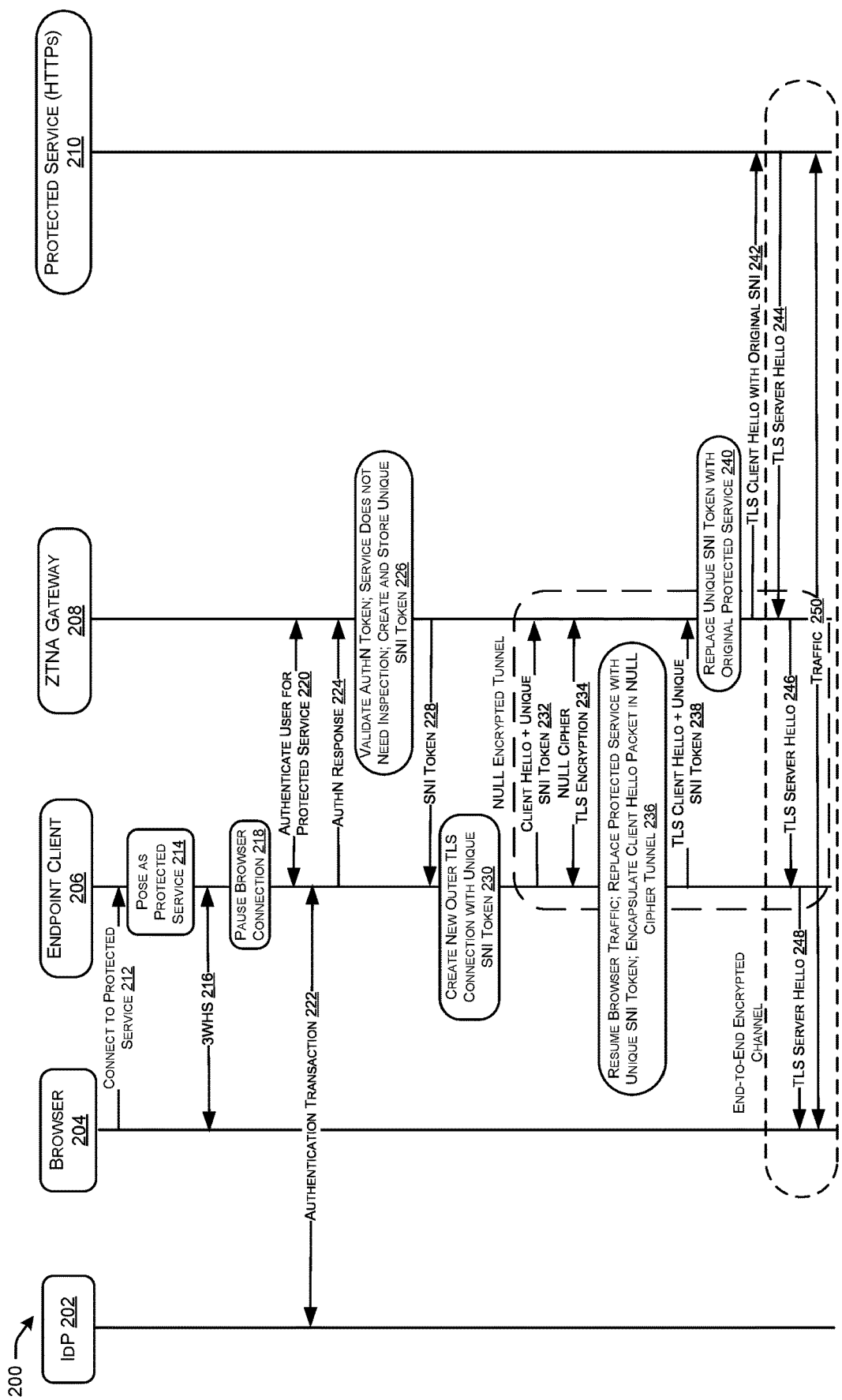
FIG. 2 schematically illustrates an example flow for eliminating double encryption in zero-trust network access (ZTNA) authenticated sessions by overloading subject name and issuer (SNI) in transport layer security (TLS) and using NULL encryption, in accordance with techniques and architecture described herein.

FIG. 2 schematically illustrates an example flow 200 for eliminating double encryption in zero-trust network access (ZTNA) authenticated sessions by overloading subject name and issuer (SNI) in transport layer security (TLS) and using NULL encryption. The example flow 200 includes an IdP 202, a browser 204 (which in configurations may be within an unprotected network), an endpoint client (proxy) 206, a ZTNA gateway 208 and a protected private service 210 that uses HTTPs.

At 212, the browser 204 attempts to access the protected private service 210. The client software on the endpoint client 206 intercepts the access and at 214 masquerades as the protected private service 210. At 216, the client software completes a transmission control protocol (TCP) 3-way handshake (3WHS) with the browser 204 and at 218 pauses or blocks the connection between the browser 204 and the protected private service 210.

At 220, the client software on the endpoint client 206 initiates a connection with the ZTNA gateway 208 to authenticate a user of the browser 204 for the protected private service 210. At 222, the ZTNA gateway 208 redirects the endpoint client 206 to the IdP 202 for authentication (AuthN). After AuthN is completed, at 224 the endpoint client 206 returns to the ZTNA gateway 208 with an AuthN token.

At 226, the ZTNA gateway 208 validates the AuthN token and determines if the protected private service 210 is already protected with a secure transport mechanism, e.g., with HTTPs or other encrypted protocols. In particular, the ZTNA gateway 208 determines from the SNI field the security policy that needs to be applied on the traffic between the browser 204 and the protected private service 210. The ZTNA gateway 208 validates the endpoint client 206 with the client certificate to avoid replay and spoofing of the packet. The ZTNA gateway 208 also determines if the protected private service 210 traffic needs to be inspected by an intrusion detection system or prevention system (IDS/IPS) service (not shown). In the example flow 200 of FIG. 2, the protected private service 210 traffic does not need to be inspected by an intrusion detection system or prevention system (IDS/IPS) service. The ZTNA gateway 208 also creates a unique SNI token and at 228 returns the unique SNI token to the endpoint client 206.

At 230, the endpoint client 206 creates another TLS connection to the ZTNA gateway 208 but this time uses the unique SNI token in the SNI field. At 232, the endpoint client 206 sends a client hello and the unique SNI token to the ZTNA gateway 208.

Since in the example flow of FIG. 2 the traffic is destined for the protected private service 210 that is already encrypted, e.g., the protected private service 210 uses HTTPS or other encrypted protocols and no inspection is needed, at 234 the ZTNA gateway 208 elects to use a NULL cipher for the TLS encryption. Once this tunnel is established, at 236 the endpoint client 206 resumes or unblocks the browser traffic and encapsulates the TLS client hello packet from the browser in the NULL cipher tunnel. Before encapsulating the client hello packet, the original SNI token for the protected private service sent by the browser 204 is replaced by the unique SNI token. The rest of the client hello fields are untouched.

At 238, the TLS client hello packet and unique SNI token are sent from the endpoint client 206 to the ZTNA gateway 208 on an authenticated channel (by virtue of the unique SNI token and cross verified with the client certificate). At 240, the ZTNA gateway decrypts the NULL encrypted data and replaces the unique SNI token with the actual SNI token associated with the protected private service 210 in the TLS client hello packet and at 242 sends the client hello with the original SNI token to the protected private service 210. At 244, the protected private service 210 responds with a TLS server hello. The ZTNA gateway 208 encapsulates this packet on the NULL cipher tunnel and at 246 sends it to the endpoint client 206. The endpoint client 206 decrypts the NULL encrypted packet and at 248 sends the packet to the browser 204. At 250, traffic may now be sent end-to-end encrypted, including the null encrypted channel, between the browser 204 and the protected private service 210.

Figure 3:
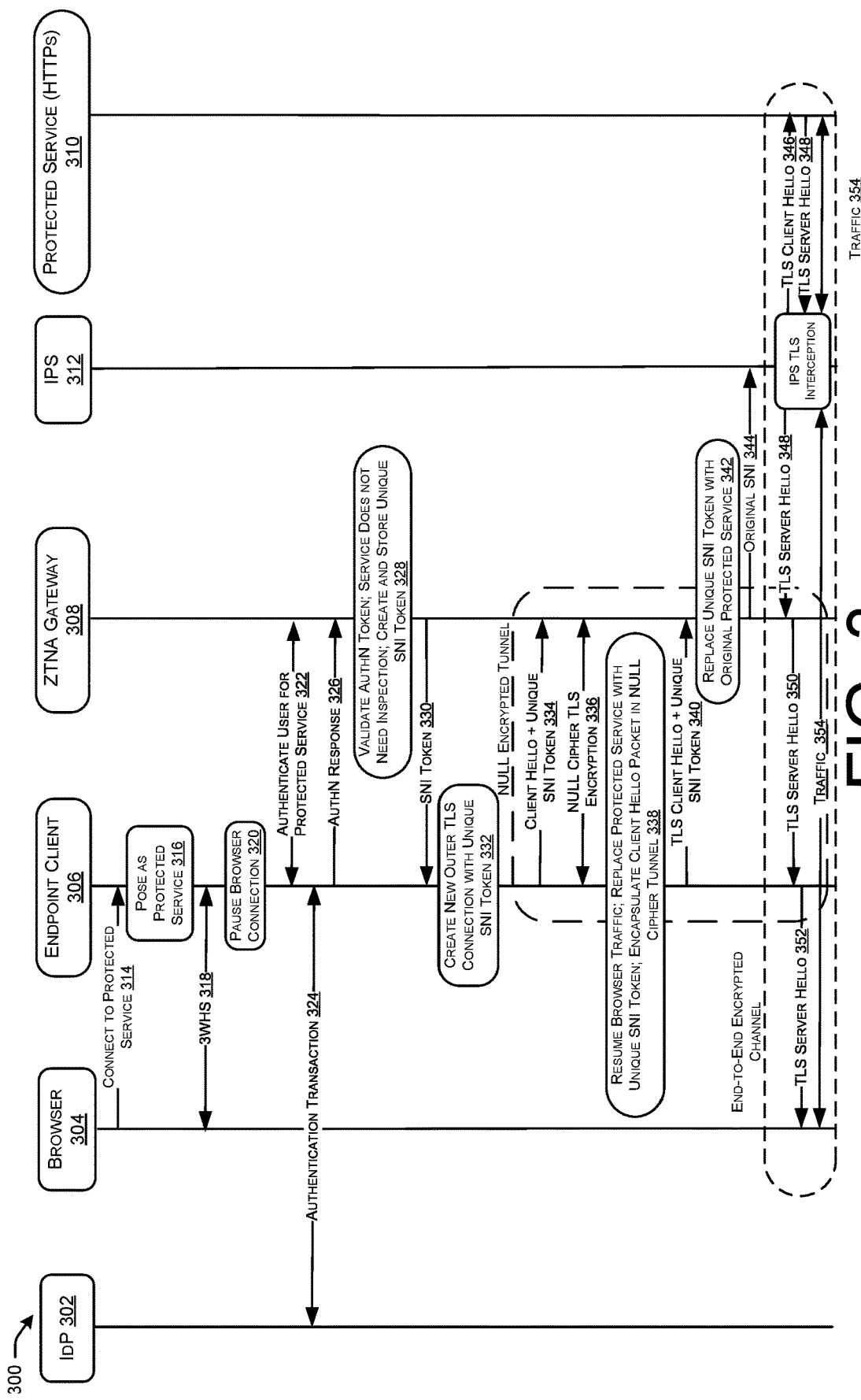
FIG. 3 schematically illustrates another example flow for eliminating double encryption in ZTNA authenticated sessions by overloading SNI in TLS and using NULL encryption, in accordance with techniques and architecture described herein.

FIG. 3 schematically illustrates another example flow 300 for eliminating double encryption in zero-trust network access (ZTNA) authenticated sessions by overloading subject name and issuer (SNI) in transport layer security (TLS) and using NULL encryption. The example flow 300 includes an IdP 302, a browser 304 (which in configurations may be within an unprotected network), an endpoint client (proxy) 306, a ZTNA gateway 308, a protected private service 310 that uses HTTPs, and an intrusion detection system or prevention system (IPS) engine 312.

At 314, the browser 304 attempts to access the protected private service 310. The client software on the endpoint client 306 intercepts the access and at 316 masquerades as the protected private service 310. At 318, the client software completes a transmission control protocol (TCP) 3-way handshake (3WHS) with the browser 304 and at 320 pauses or blocks the connection between the browser 304 and the protected private service 310.

At 322, the client software on the endpoint client 306 initiates a connection with the ZTNA gateway 308 to authenticate a user of the browser 304 for the protected private service 310. At 324, the ZTNA gateway 308 redirects the endpoint client 306 to the IdP 302 for authentication (AuthN). After AuthN is completed, at 326 the endpoint client 306 returns to the ZTNA gateway 308 with an AuthN token.

At 328, the ZTNA gateway 308 validates the AuthN token and determines if the protected private service 310 is already protected with a secure transport mechanism, e.g., with HTTPs or other encrypted protocols. In particular, the ZTNA gateway 308 determines from the SNI field the security policy that needs to be applied on the traffic between the browser 304 and the protected private service 310. The ZTNA gateway 308 validates the endpoint client 306 with the client certificate to avoid replay and spoofing of the packet. The ZTNA gateway 308 also determines if the protected private service 310 traffic needs to be inspected by the IPS engine 312. In the example flow 300 of FIG. 3, the protected private service 310 traffic does need to be inspected by IPS engine 312. The ZTNA gateway 308 also creates a unique SNI token and at 330 returns the unique SNI token to the endpoint client 306.

At 332, the endpoint client 306 creates another TLS connection to the ZTNA gateway 308 but this time uses the unique SNI token in the SNI field. At 334, the endpoint client 306 sends a client hello and the unique SNI token to the ZTNA gateway 308.

Since in the example flow of FIG. 3 the traffic is destined for the protected private service 310 that is already encrypted, e.g., the protected private service 310 uses HTTPS or other encrypted protocols but inspection is needed, at 336 the ZTNA gateway 308 elects to use a NULL cipher for the TLS encryption. Once this tunnel is established, at 338 the endpoint client 306 resumes or unblocks the browser traffic and encapsulates the TLS client hello packet from the browser 304 in the NULL cipher tunnel. Before encapsulating the client hello packet, the original SNI token for the protected private service sent by the browser 304 is replaced by the unique SNI token. The rest of the client hello fields are untouched.

At 340, the TLS client hello packet and unique SNI token are sent from the endpoint client 306 to the ZTNA gateway 308 on an authenticated channel (by virtue of the unique SNI token and cross verified with the client certificate). At 342, the ZTNA gateway decrypts the NULL encrypted data and replaces the unique SNI token with the actual SNI token associated with the protected private service 310 in the client hello packet and at 344 sends it to the IPS engine 312. At 346, the IPS engine 312 sends a TLS client hello to the protected private service 310. At 346, the protected private service 110 responds with a server hello to the IPS engine 312, which at 348 is sent to the ZTNA gateway 308. The ZTNA gateway 308 encapsulates this packet on the NULL cipher tunnel and at 350 sends it to the endpoint client 306. The endpoint client 306 decrypts the NULL encrypted packet and at 352 sends the packet to the browser 304. At 354, traffic may now be sent between the browser 304 and the IPS engine 312. Thus, since between the ZTNA gateway 308 and the protected private service 310 the IPS engine needs to inspect the traffic, then the inner encryption is between the browser 304 and the IPS engine 312 and the outer is NULL encrypted in cases where the protected private service 310 is using HTTPs, SSH, etc.

Figure 4:
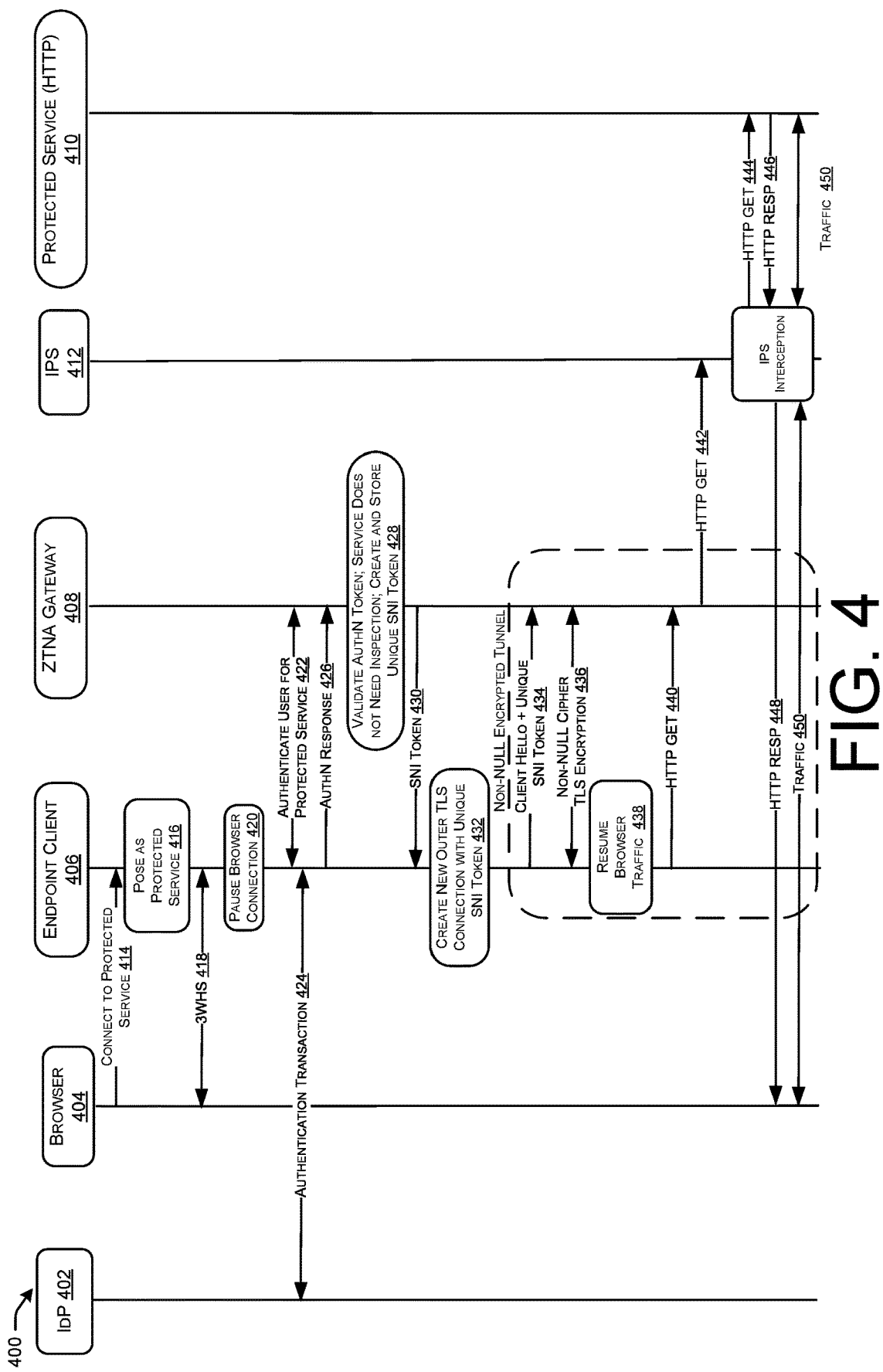
FIG. 4 schematically illustrates an example flow for eliminating double encryption in ZTNA authenticated sessions by overloading SNI in TLS and using non-NULL encryption, in accordance with the techniques and architecture described herein.

If the backend application, e.g., the protected private service 310, does not use a secure transport mechanism such as, for example, HTTPs or secure shell (SSH) between the ZTNA gateway 308 and the protected private service 310 and the IPS engine 312 needs to inspect the traffic, then the outer tunnel, e.g., the tunnel between the endpoint client 306 and the ZTNA gateway 308, uses a non-NULL cipher for encryption and internal network traffic is plain traffic. FIG. 4 schematically illustrates an example flow 400 for eliminating double encryption in zero-trust network access (ZTNA) authenticated sessions by overloading subject name and issuer (SNI) in transport layer security (TLS) and using non-NULL encryption in such a scenario. The example flow 400 includes an IdP 402, a browser 404 (which in configurations may be within an unprotected network), an endpoint client (proxy) 406, a ZTNA gateway 408, a protected private service 410 that uses HTTP, and an intrusion detection system or prevention system (IPS) engine 412.

At 414, the browser 404 attempts to access the protected private service 410. The client software on the endpoint client 406 intercepts the access and at 416 masquerades as the protected private service 410. At 418, the client software completes a transmission control protocol (TCP) 3-way handshake (3WHS) with the browser 404 and at 420 pauses or blocks the connection between the browser 404 and the protected private service 410.

At 422, the client software on the endpoint client 406 initiates a connection with the ZTNA gateway 408 to authenticate a user of the browser 404 for the protected private service 410. At 424, the ZTNA gateway 408 redirects the endpoint client 406 to the IdP 402 for authentication (AuthN). After AuthN is completed, at 426 the endpoint client 406 returns to the ZTNA gateway 408 with an AuthN token.

At 428, the ZTNA gateway 408 validates the AuthN token and determines if the protected private service 410 is already protected with a secure transport mechanism, e.g., with HTTPs or other encrypted protocols. In particular, the ZTNA gateway 408 determines from the SNI field the security policy that needs to be applied on the traffic between the browser 404 and the protected private service 410. The ZTNA gateway 408 validates the endpoint client 406 with the client certificate to avoid replay and spoofing of the packet. The ZTNA gateway 408 also determines if the protected private service 410 traffic needs to be inspected by the IPS engine 412. In the example flow 400 of FIG. 4, the protected private service 410 traffic does need to be inspected by IPS engine 412. The ZTNA gateway 408 also creates a unique SNI token and at 430 returns the unique SNI token to the endpoint client 406.

At 432, the endpoint client 406 creates another TLS connection to the ZTNA gateway 408 but this time uses the unique SNI token in the SNI field. At 434, the endpoint client 406 sends a client hello and the unique SNI token to the ZTNA gateway 408.

Since in the example flow of FIG. 4 the traffic is destined for the protected private service 410 that is not encrypted, e.g., the protected private service 410 uses HTTP or other similar protocols, and inspection is needed, at 436 the ZTNA gateway 408 elects to use a non-NULL cipher for the TLS encryption during the TLS negotiation and TLS tunnel creation. Once this tunnel is established, at 438 the endpoint client 406 resumes or unblocks the browser traffic and at 440 sends a HTTP GET message with the unique SNI token to the ZTNA gateway 408 in the non-NULL cipher tunnel.

At 442, the HTTP GET message and unique SNI token are sent from the ZTNA gateway 208 to the IPS engine 412. At 444, the IPS engine 412 sends HTTP GET message and unique SNI token to the IPS engine 412. At 446, the protected private service 410 responds with a HTTP RESP message to the IPS engine 412, which at 448 is sent to the browser 404. At 450, traffic may now be sent between the browser 404 and the IPS engine 412. Thus, since the protected private service 410 is using HTTP, then the traffic between the endpoint client 406 and the ZTNA gateway 408 is encrypted with a non-NULL cipher and the outer traffic is plain traffic.

Figure 5:
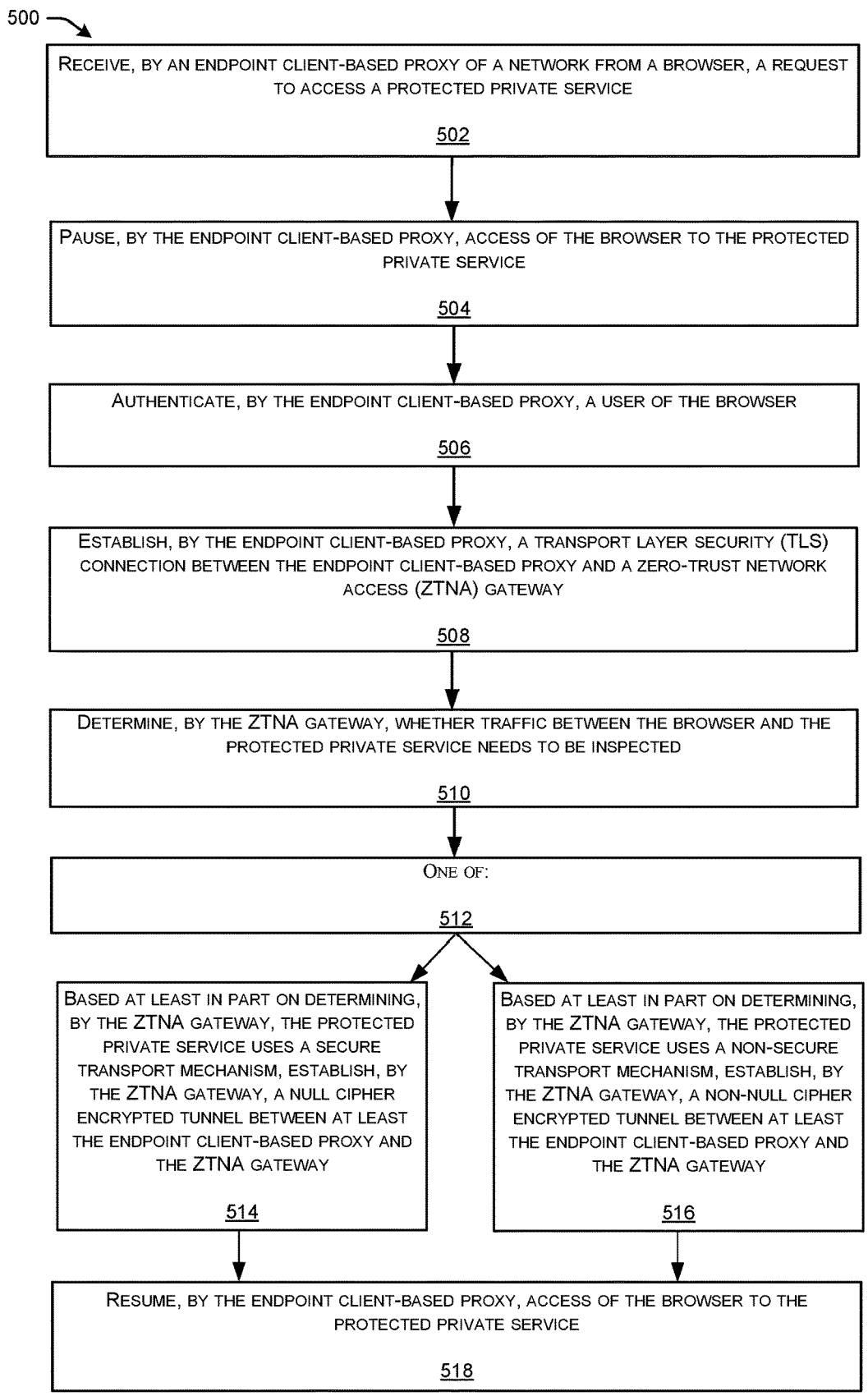
FIG. 5 illustrates a flow diagram of an example method for abstracting a real physical twin network wherein security policies are mapped as an overlay on a graphical representation of the network topology, in accordance with the techniques and architecture described herein.

FIG. 5 illustrates a flow diagram of an example method 500 and illustrates aspects of the functions performed at least partly by devices of a network as described with respect to FIGS. 1-4. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 5 illustrates a flow diagram of an example method 500 for abstracting a real physical twin network wherein security policies are mapped as an overlay on a graphical representation of the network topology. In some examples, the method 500 may be performed by a system comprising one or more processors and one or more non-transitory computer-readable media storing computer-executable instructions that, when executed by the one or more processors, cause the one or more processors to perform the method 500.

At 502, an endpoint client-based proxy of a network from a browser receives a request to access a protected private service. For example, the browser 204 attempts to access the protected private service 210. The client software on the endpoint client 206 intercepts the access and at 216 masquerades as the protected private service 210. The client software completes a transmission control protocol (TCP) 3-way handshake (3WHS) with the browser 204.

At 504, the endpoint client-based proxy pauses access of the browser to the protected private service. For example, at 220 the client software on the endpoint client 206 pauses or blocks the connection between the browser 204 and the protected private service 210.

At 506, the endpoint client-based proxy authenticates a user of the browser. For example, at 222, the client software on the endpoint client 206 initiates a connection with the ZTNA gateway 208 to authenticate a user of the browser 204 for the protected private service 210. At 224, the ZTNA gateway 208 redirects the endpoint client 206 to the IdP 202 for authentication (AuthN). After AuthN is completed, at 226 the endpoint client 206 returns to the ZTNA gateway 208 with an AuthN token.

At 508, the endpoint client-based proxy establishes a transport layer security (TLS) connection between the endpoint client-based proxy and a zero-trust network access (ZTNA) gateway. For example, at 232, the endpoint client 206 creates another TLS connection to the ZTNA gateway 208 but this time uses a unique SNI token in the SNI field. At 234, the endpoint client 206 sends a client hello and the unique SNI token to the ZTNA gateway 208.

At 510, the ZTNA gateway determines whether traffic between the browser and the protected private service needs to be inspected. At 512, one of either (i) 514, based at least in part on determining, by the ZTNA gateway, the protected private service uses a secure transport mechanism, the ZTNA gateway establishes a null cipher encrypted tunnel between at least the endpoint client-based proxy and the ZTNA gateway, or (ii) 516, based at least in part on determining, by the ZTNA gateway, the protected private service uses a non-secure transport mechanism, the ZTNA gateway establishes a non-null cipher encrypted tunnel between at least the endpoint client-based proxy and the ZTNA gateway. For example, at 228, the ZTNA gateway 208 validates the AuthN token and determines if the protected private service 210 is already protected with a secure transport mechanism, e.g., with HTTPs or other encrypted protocols. In particular, the ZTNA gateway 208 determines from the SNI field the security policy that needs to be applied on the traffic between the browser 204 and the protected private service 210. The ZTNA gateway 208 validates the endpoint client 206 with the client certificate to avoid replay and spoofing of the packet. The ZTNA gateway 208 also determines if the protected private service 210 traffic needs to be inspected by the IPS engine 212. The ZTNA gateway 208 also creates a unique SNI token and at 230 returns the unique SNI token to the endpoint client 206.

At 518, the endpoint client-based proxy resumes access of the browser to the protected private service. For example, once the tunnel is established, at 238 the endpoint client 206 resumes or unblocks the browser traffic and encapsulates the TLS client hello packet from the browser 204.

Thus, in accordance with configurations described herein, at any point in time, there is only one level of encryption involved. The unique SNI token is generated on a per app per user per session basis. This ensures that observers do not see which services are being accessed behind the gateway or which services are protected by the gateway. Since only one level of encryption is used at any time, the compute requirements are reduced. The latency and throughput are also improved and can scale much higher when compared to double encryption mechanisms. Additionally, the NULL encryption and decryption are almost zero cost and thus save precious compute resources.

Figure 6:
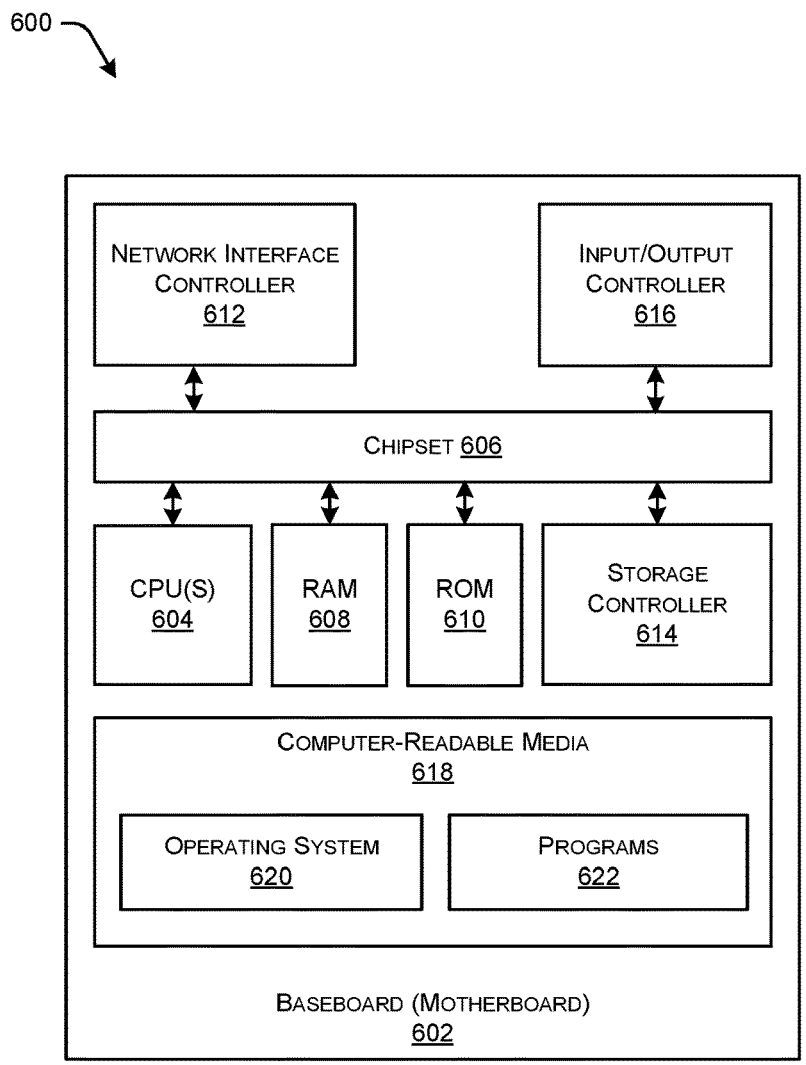
FIG. 6 is a computer architecture diagram showing an example computer hardware architecture for implementing a device that can be utilized to implement aspects of the various technologies presented herein.

FIG. 6 shows an example computer architecture for a computing device 600 capable of executing program components for implementing the functionality described above. In configurations, one or more of the computing devices 600 may be used to implement one or more of the components of FIGS. 1-5. The computer architecture shown in FIG. 6 illustrates a conventional server computer, router, switch, workstation, desktop computer, laptop, tablet, network appliance, e-reader, smartphone, or other computing device, and can be utilized to execute any of the software components presented herein. The computing device 600 may, in some examples, correspond to a physical device or resources described herein.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates.

These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network. The chipset 606 can include functionality for providing network connectivity through a NIC 612, such as a gigabit Ethernet adapter. In configurations, the NIC 612 can be a smart NIC (based on data processing units (DPUs)) that can be plugged into data center servers to provide networking capability. The NIC 612 is capable of connecting the computing device 600 to other computing devices over networks. It should be appreciated that multiple NICs 612 can be present in the computing device 600, connecting the computer to other types of networks and remote computer systems.

The computing device 600 can include a storage device 618 that provides non-volatile storage for the computer. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the cloud network, and or any components included therein, may be supported by one or more devices similar to computing device 600. Stated otherwise, some or all of the operations described herein may be performed by one or more computing devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIGS. 1-5. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

The computing device 600 may support a virtualization layer, such as one or more virtual resources executing on the computing device 600. In some examples, the virtualization layer may be supported by a hypervisor that provides one or more virtual machines running on the computing device 600 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    receiving, by an endpoint client-based proxy of a network from a browser, a request to access a protected private service;
    pausing, by the endpoint client-based proxy, access of the browser to the protected private service;
    authenticating, by the endpoint client-based proxy, a user of the browser;
    establishing, by the endpoint client-based proxy, a transport layer security (TLS) connection between the endpoint client-based proxy and a zero-trust network access (ZTNA) gateway;
    determining, by the ZTNA gateway, whether traffic between the browser and the protected private service needs to be inspected, wherein determining whether traffic between the browser and the protected private service needs to be inspected comprises determining, by the ZTNA gateway, whether traffic between the browser and the protected private service needs to be inspected based at least in part on a subject name and issuer (SNI) token associated with the protected private service;
    one of:
        based at least in part on determining, by the ZTNA gateway, the protected private service uses a secure transport mechanism, establishing, by the ZTNA gateway, a null cipher encrypted tunnel between at least the endpoint client-based proxy and the ZTNA gateway; or
        based at least in part on determining, by the ZTNA gateway, the protected private service uses a non-secure transport mechanism, establishing, by the ZTNA gateway, a non-null cipher encrypted tunnel between at least the endpoint client-based proxy and the ZTNA gateway;
    generating, by the ZTNA gateway, a unique SNI token;
    providing, by the ZTNA gateway to the endpoint client-based proxy, the unique SNI token; and
    resuming, by the endpoint client-based proxy, access of the browser to the protected private service, wherein resuming access of the browser to the protected private service comprises replacing the SNI token associated with the protected private service in a client hello packet with the unique SNI token.

2. The method of claim 1, wherein the ZTNA gateway determines that traffic between the browser and the protected private service needs to be inspected and the method further comprises:
    inspecting, by an intrusion prevention service (IPS) engine, traffic between the browser and the protected private service.

3. The method of claim 2, wherein the ZTNA gateway determines the protected private service uses the secure transport mechanism and the method further comprises:
    establishing, by the ZTNA gateway, a null cipher encrypted tunnel between the endpoint client-based proxy and the ZTNA gateway.

4. The method of claim 2, wherein the ZTNA gateway determines the protected private service uses the non-secure transport mechanism and the method further comprises:
    establishing, by the ZTNA gateway, a non-null cipher encrypted tunnel between the endpoint client-based proxy and the ZTNA gateway.

5. The method of claim 1, wherein the ZTNA gateway determines that traffic between the browser and the protected private service does not need to be inspected and the method further comprises:
    establishing, by the ZTNA gateway, a null cipher encrypted tunnel between the endpoint client-based proxy and the ZTNA gateway.

6. The method of claim 1, further comprising:
    replacing, by the ZTNA gateway, the unique SNI token in the client hello packet with the SNI token associated with the protected private service; and
    forwarding, by the ZTNA gateway to the protected private service, the client hello packet with the SNI token associated with the protected private service.

7. A system comprising:
    one or more processors; and
    one or more non-transitory computer-readable media storing computer-executable instructions that, when executed by the one or more processors, cause the one or more processors to perform actions comprising:
        receiving, by an endpoint client-based proxy of a network from a browser, a request to access a protected private service;
        pausing, by the endpoint client-based proxy, access of the browser to the protected private service;
        authenticating, by the endpoint client-based proxy, a user of the browser;
        establishing, by the endpoint client-based proxy, a transport layer security (TLS) connection between the endpoint client-based proxy and a zero-trust network access (ZTNA) gateway;
        determining, by the ZTNA gateway, whether traffic between the browser and the protected private service needs to be inspected, wherein determining whether traffic between the browser and the protected private service needs to be inspected comprises determining, by the ZTNA gateway, whether traffic between the browser and the protected private service needs to be inspected based at least in part on a subject name and issuer (SNI) token associated with the protected private service;
        one of:

based at least in part on determining, by the ZTNA gateway, the protected private service uses a secure transport mechanism, establishing, by the ZTNA gateway, a null cipher encrypted tunnel between at least the endpoint client-based proxy and the ZTNA gateway; or based at least in part on determining, by the ZTNA gateway, the protected private service uses a non-secure transport mechanism, establishing, by the ZTNA gateway, a non-null cipher encrypted tunnel between at least the endpoint client-based proxy and the ZTNA gateway;

generating, by the ZTNA gateway, a unique SNI token;

providing, by the ZTNA gateway to the endpoint client-based proxy, the unique SNI token; and resuming, by the endpoint client-based proxy, access of the browser to the protected private service, wherein resuming access of the browser to the protected private service comprises replacing the SNI token associated with the protected private service in a client hello packet with the unique SNI token.

8. The system of claim 7, wherein the ZTNA gateway determines that traffic between the browser and the protected private service needs to be inspected and the actions further comprise:

inspecting, by an intrusion prevention service (IPS) engine, traffic between the browser and the protected private service.

9. The system of claim 8, wherein the ZTNA gateway determines the protected private service uses the secure transport mechanism and the actions further comprise:

establishing, by the ZTNA gateway, a null cipher encrypted tunnel between the endpoint client-based proxy and the ZTNA gateway.

10. The system of claim 8, wherein the ZTNA gateway determines the protected private service uses the non-secure transport mechanism and the actions further comprise:

establishing, by the ZTNA gateway, a non-null cipher encrypted tunnel between the endpoint client-based proxy and the ZTNA gateway.

11. The system of claim 7, wherein the ZTNA gateway determines that traffic between the browser and the protected private service does not need to be inspected and the actions further comprise:

establishing, by the ZTNA gateway, a null cipher encrypted tunnel between the endpoint client-based proxy and the ZTNA gateway.

12. The system of claim 7, further comprising:

replacing, by the ZTNA gateway, the unique SNI token in the client hello packet with the SNI token associated with the protected private service; and forwarding, by the ZTNA gateway to the protected private service, the client hello packet with the SNI token associated with the protected private service.

13. One or more non-transitory computer-readable media storing computer-executable instructions that, when executed by one or more processors, cause the one or more processors to perform actions comprising:

receiving, by an endpoint client-based proxy of a network from a browser, a request to access a protected private service;

pausing, by the endpoint client-based proxy, access of the browser to the protected private service;

authenticating, by the endpoint client-based proxy, a user of the browser;

establishing, by the endpoint client-based proxy, a transport layer security (TLS) connection between the endpoint client-based proxy and a zero-trust network access (ZTNA) gateway;

determining, by the ZTNA gateway, whether traffic between the browser and the protected private service needs to be inspected, wherein determining whether traffic between the browser and the protected private service needs to be inspected comprises determining, by the ZTNA gateway, whether traffic between the browser and the protected private service needs to be inspected based at least in part on a subject name and issuer (SNI) token associated with the protected private service;

one of:

based at least in part on determining, by the ZTNA gateway, the protected private service uses a secure transport mechanism, establishing, by the ZTNA gateway, a null cipher encrypted tunnel between at least the endpoint client-based proxy and the ZTNA gateway; or based at least in part on determining, by the ZTNA gateway, the protected private service uses a non-secure transport mechanism, establishing, by the ZTNA gateway, a non-null cipher encrypted tunnel between at least the endpoint client-based proxy and the ZTNA gateway;

generating, by the ZTNA gateway, a unique SNI token;

providing, by the ZTNA gateway to the endpoint client-based proxy, the unique SNI token; and resuming, by the endpoint client-based proxy, access of the browser to the protected private service, wherein resuming access of the browser to the protected private service comprises replacing the SNI token associated with the protected private service in a client hello packet with the unique SNI token.

14. The one or more non-transitory computer-readable media of claim 13, wherein the ZTNA gateway determines that traffic between the browser and the protected private service needs to be inspected and the actions further comprise:

inspecting, by an intrusion prevention service (IPS) engine, traffic between the browser and the protected private service.

15. The one or more non-transitory computer-readable media of claim 14, wherein the ZTNA gateway determines the protected private service uses the secure transport mechanism and the actions further comprise:

establishing, by the ZTNA gateway, a null cipher encrypted tunnel between the endpoint client-based proxy and the ZTNA gateway.

16. The one or more non-transitory computer-readable media of claim 14, wherein the ZTNA gateway determines the protected private service uses the non-secure transport mechanism and the actions further comprise:

establishing, by the ZTNA gateway, a non-null cipher encrypted tunnel between the endpoint client-based proxy and the ZTNA gateway.

17. The one or more non-transitory computer-readable media of claim 13, wherein the ZTNA gateway determines that traffic between the browser and the protected private service does not need to be inspected and the actions further comprise:

establishing, by the ZTNA gateway, a null cipher encrypted tunnel between the endpoint client-based proxy and the ZTNA gateway.

18. The one or more non-transitory computer-readable media of claim 13, further comprising:
  replacing, by the ZTNA gateway, the unique SNI token in the client hello packet with the SNI token associated with the protected private service; and
  forwarding, by the ZTNA gateway to the protected private service, the client hello packet with the SNI token associated with the protected private service.

* * * * *